(12) United States Patent
Chikaraishi et al.

(10) Patent No.: US 6,805,017 B2
(45) Date of Patent: Oct. 19, 2004

(54) MOTOR-DRIVEN POWER STEERING DEVICE

(75) Inventors: Kazuo Chikaraishi, Gunma-ken (JP); Masamichi Ohshima, Gunma-ken (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 10/049,602

(22) PCT Filed: Jun. 15, 2001

(86) PCT No.: PCT/JP01/05121

§ 371 (c)(1),
(2), (4) Date: Feb. 14, 2002

(87) PCT Pub. No.: WO01/98678

PCT Pub. Date: Dec. 27, 2001

(65) Prior Publication Data

US 2002/0112555 A1 Aug. 22, 2002

(30) Foreign Application Priority Data

Jun. 19, 2000 (JP) .................................... 2000-183085
Jul. 7, 2000 (JP) .................................... 2000-207156

(51) Int. Cl.⁷ ................................................ B62D 5/04
(52) U.S. Cl. ............ 74/388 OPS; 464/30; 180/444; 180/443
(58) Field of Search ............ 74/388 PS, 496, 74/498, 500, 425, 439, 446, 443, DIG. 10; 464/30; 29/893; 180/444, 443; 427/287, 486

(56) References Cited

U.S. PATENT DOCUMENTS

| | | | | |
|---|---|---|---|---|
| 4,077,247 A | * | 3/1978 | Stewart .................. | 72/325 |
| 5,445,238 A | | 8/1995 | Chikuma et al. .......... | 180/79.1 |
| 5,819,871 A | * | 10/1998 | Takaoka .................. | 180/444 |
| 5,971,094 A | * | 10/1999 | Joshita .................. | 180/444 |
| 6,286,474 B1 | * | 9/2001 | Downs et al. ........... | 123/192.2 |
| 6,425,455 B1 | * | 7/2002 | Kurokawa et al. ........ | 180/444 |
| 6,470,993 B1 | * | 10/2002 | Matsuda et al. .......... | 180/444 |

FOREIGN PATENT DOCUMENTS

| | | |
|---|---|---|
| EP | 0 666 210 | 8/1995 |
| EP | 0 915 004 | 5/1999 |
| JP | 58-35040 | 3/1983 |
| JP | 7-119810 | 5/1995 |
| JP | 7-215227 | 8/1995 |
| JP | 7-223548 | 8/1995 |
| JP | 8-80858 | 3/1996 |
| JP | 9-20256 | 1/1997 |
| JP | UM 2556890 | 8/1997 |
| JP | 10-100912 | 4/1998 |
| JP | 10-220560 | 8/1998 |
| JP | 10-329732 | 12/1998 |
| JP | 11-29052 | 2/1999 |
| JP | 11-139326 | 5/1999 |
| JP | 11-192955 | 7/1999 |

* cited by examiner

Primary Examiner—David A. Pecci
Assistant Examiner—Bradley J. Van Pelt
(74) Attorney, Agent, or Firm—Miles & Stockbridge P.C.

(57) ABSTRACT

An electric power steering apparatus can correspond to high output ability, and has a power transmission mechanism of an electric driving section capable of achieving predetermined slip torque in spite of change of operating temperature. Also, a resin gear for power transmission is formed by joining a core metal and a resin with strong bonding force, and has preferable heat-dissipation property. This joining is performed by way of chemical bond according to composite molding technique or adhesive.

12 Claims, 13 Drawing Sheets

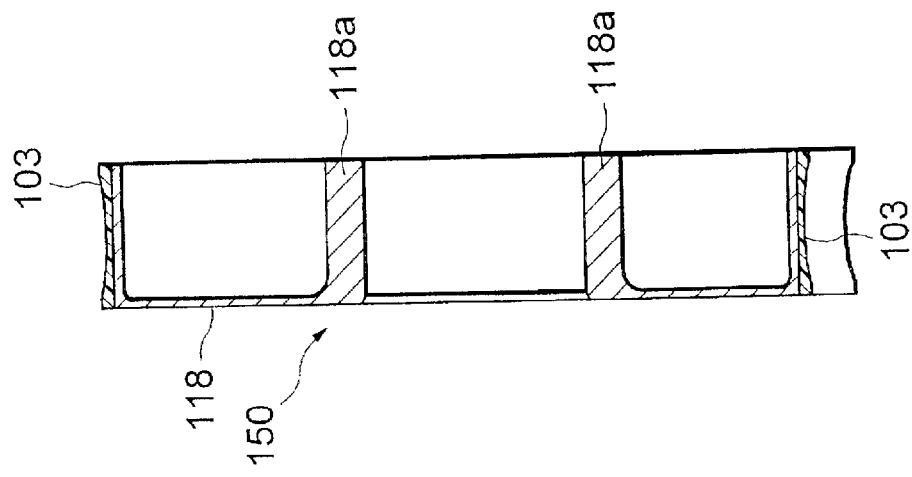
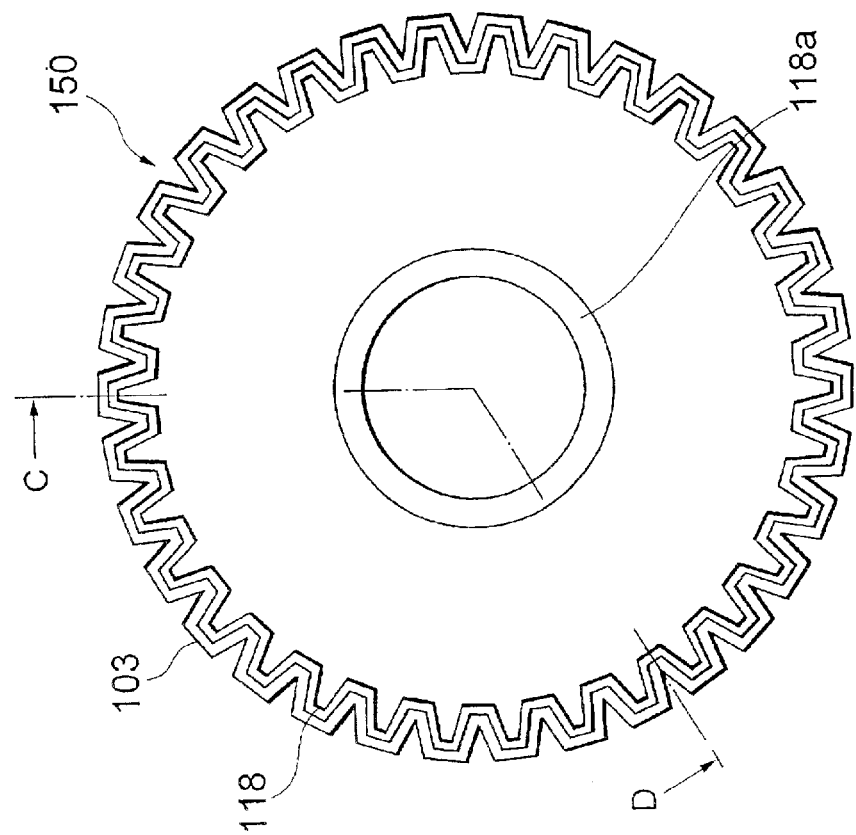

MOTOR-DRIVEN POWER STEERING DEVICE

TECHNICAL FIELD

The present invention relates to an electrically power assisting steering apparatus.

BACKGROUND ARTS

In the operation of an electrically power assisting steering apparatus (hereinafter called as an EPS apparatus) wherein turning force of an electric motor becoming auxiliary steering torque is decelerated by a gear device to transmit it to an output shaft, thereby to assist a driver's power for rotating a steering wheel to steer wheels, e.g., when the steering wheel is rotated up to a stroke end of a rack and the steering is abruptly stopped, the motor can not stop immediately due to inertia force and occasionally, excessive torque is produced in the decelerating gear portion. In order to protect decelerating gears against the excessive torque, conventionally, a torque limiter using a friction plate is provided between a motor and a worm, or a torque limiter using a ring member for applying elastic force is provided between an output shaft and a worm wheel. Thereby, at the time of generation of such excessive torque, slip is developed between both of them to prevent transmission of the excessive torque.

In an EPS apparatus, generally, a worm is formed of iron material, and a worm wheel is made by forming a gear portion of resin material integrally on the outer peripheral surface of a core portion of solid iron material by way of adhesion, fusion or injection molding. Also, an output shaft having the worm wheel mounted thereon is formed of iron material the same as the core metal.

In this field of the art, the ring member for applying elastic force used for the torque limiter provided between the output shaft and the worm wheel is called as a rotation transmitting member or a torque setting member, etc., or is known as a tolerance ring (trade name: Rencol Tolerance Rings).

As mentioned above, in the conventional EPS apparatus, since the core metal portion of the worm wheel constituting the gear device is formed of solid iron material, there are the following problems. First, when attempting to correspond to achieving high output of the EPS apparatus, it is necessary to make the diameter of the worm wheel large for high strength and high module ability. However, in that case, the weight of the core metal portion is increased and inertial force in steering is increased, so that a driver's feeling in rotating the steering wheel and cutting of the steering wheel are deteriorated. Also, in compliance with the enlargement of the diameter of the core metal portion, when the diameter of the resin gear portion is enlarged, accuracy of the gears might be worsened to cause increase of noise of the gears in operation since dimensional change of resin due to moisture absorption and temperature is large. Also, the strength of the gear might be lowered since there is the danger of occurring voids in the resin portion due to injection molding. Thus, in the conventional EPS apparatus, there are problems in making the diameter of the worm wheel large.

Next, by comparison on the basis of ordinary temperature, the resin gear portion has characteristics in that its strength is lowered under high temperature and is heightened under low temperature. However, the conventional output shaft and the core metal portion are made of iron material and their linear expansion coefficients are approximately the same, so that the limit torque of the torque limiter is constant to temperature. Therefore, the limit torque of the torque limiter needs to be set at the maximum operating temperature, and needs to be set low, whereby the difference between the limit torque and the transmission torque was small. When the ring is worn and the limit torque is lowered because of long-term use of the EPS apparatus, the torque transmission might not be carried out, and thereby the designing is difficult.

For example, a worm wheel is disclosed in the Japanese Utility Model Publication No. 2556890 and the Japanese Patent Application Laid-Open No. 7-215227. As shown in FIGS. 15A and 15B, the worm wheel has a core metal X19 and a resin ring X20. The entire outer peripheral surface of the core metal 19X is formed in the shape of a gear with irregularities X19a constituted of rotational direction stopping serrations X19b and axial direction stopping projections X19c. The resin ring X20 with teeth on its outer peripheral surface is fitted on the irregularities X19a of the core metal X19. As the thickness of the resin ring X20 is properly set, it is possible to maintain proper backlash between the gears even though atmospheric temperature is changed.

Also, in a worm wheel disclosed in the Japanese Patent Application Laid-Open No. 11-192955, an approximately gear-shaped core metal is used for enhancement of the strength of the teeth, and the gear-shaped rim portion of the core metal is covered by a resin by way of injection such that the cross section of the resin in the axial direction becomes a rectangle. Then, the binding of the rim portion and the resin depends on the strength of the cooled and hardened thin resin layer.

However, in the conventional worm wheel of the Japanese Utility Model Publication No. 2556890 and the Japanese Patent Application Laid-Open No. 7-215227, the resin ring X20 is fitted on the irregularities X19a formed on the outer peripheral surface of the metallic core metal 19X, but since the mechanical strength of the resin is inferior to that of metal, the module needs to be enlarged in comparison with a metal gear, and the thickness of the teeth needs to be made larger than that of the metallic portion, whereby there occurs a problem that the decelerating mechanism is enlarged.

Also, the resin with the large thickness is inferior in heat-dissipation ability, and so the thickness of the resin is set appropriately, but there is a problem in that wear of the resin is increased due to heat produced in the engagement of the gears. Especially, as shown in FIG. 16, when the worm wheel is incorporated in the EPS apparatus and disposed in an engine room, the temperature condition is severe and it is difficult to secure the durability under high temperature environment. (Description of the structure of an EPS apparatus in FIG. 16 will be made later in the description of the preferred embodiments and then omitted here).

Further, since the binding power of the core metal X19 and the resin ring X20 depends on mechanical catching of the irregularities 19a, it is necessary to form the thickness of the resin ring X20 large so as to make the resin ring X20 withstand the slipping-off force. In case of using nylon family resin, as it has water absorptive property, the larger the volume of the resin becomes, the larger its dimensional change caused by expansion due to water absorption becomes. However, in the EPS apparatus, as a driver rotates a steering wheel, a steering assisting force is transmitted via the decelerating mechanism, whereby the rotational directions in the decelerating mechanism are reversed intricately. Therefore, in order to prevent noise from the teeth surfaces of the gears, it is necessary to control such that the backlash becomes extremely small. As mentioned above, when the volume of the resin is large, its dimensional change due to water absorption is considerably large. Therefore, there is a problem in that when the resin absorbs water and expands to the extent that the backlash is lost, the operability is deteriorated.

Further, in the worm wheel disclosed in the Japanese Patent Application Laid-Open No. 11-192955, external force generated due to the engagement of the gears acts on the thin resin layer as tensile stress, so that the resin is easily broken and it is difficult to obtain strength. Also, in a case where the core metal is used as the insert in an injection molding, when the high temperature resin is cooled and contracted, residual tensile stress is produced. In this case, the joining of the resin and the core metal relies on mechanical catching, and if only a one portion of the resin is broken, the broken-out surface is enlarged due to the internal stress, so that the binding force is lost.

Two types of resin worm wheels are mass-produced: resin of MC nylon type and resin containing glass fiber type. In the case of the former MC nylon worm wheel, while a tube-like MC nylon and a core metal with irregularities (knurls) as described above on its outer peripheral surface are subjected to high frequency induction heating, their joining portions are tight-contacted and bonded with adhesive. However, the cost of the MC nylon is very high, and its heat resistance is up to 80° C.

On the other hand, the latter worm wheel is produced by injection-molding the resin on irregularities of the outer peripheral surface of a core metal which is fairly lager than that of the MC nylon type, and thereby fixing the resin by the irregularities mechanically. In this case, since heated resin is injected, the resin is contracted when cooled, and tensile stress acts on the interface between the resin and the core metal. Accordingly, if even a one portion of voids and a weld line is broken, a crack is spread and the fixing force between the core metal and the resin is lost. Further, although the heat resistance of the resin is up to 120° C., there is a problem in that operability is reduced due to expansion of the resin caused by water absorption.

DISCLOSURE OF THE INVENTION

It is a first object of the present invention to provide an electric power steering apparatus equipped with a power transmission mechanism of an electric driving section capable of corresponding to high output, and achieving predetermined slip torque in accordance with change in operating temperature.

In order to achieve the first object of the present invention, in an EPS apparatus provided with a torque limiter having a ring member for applying elastic force between a worm wheel and an output shaft, the output shaft is made of iron material, a gear portion of the worm wheel is made of resin material, and a core metal portion thereof is made of metallic material whose specific gravity is small and linear expansion coefficient is large with respect to the iron material thereby to set limit torque of the torque limiter low under high temperature and high under low temperature.

It is a second object of the present invention to provide an EPS apparatus having a worm wheel incorporated in a transmission pathway of auxiliary steering force in which a core metal and a resin are bonded with strong bonding power, heat dissipation ability is preferable, and miniaturization is possible by the use of the minimum amount of resin.

In order to achieve the second object, in an EPS apparatus having a worm wheel incorporated therein for transmitting driving force of a motor as auxiliary steering force together with a worm gear, the present invention proposes the worm wheel formed by joining a thin resin to the entire outer peripheral surface of teeth portion of a gear-shaped core metal by way of chemical bond according to composite molding technique, or by means of adhesive. Further, the core metal can be made of aluminum alloy or copper alloy. As structured above, the bonding of the teeth portion of the core metal and the resin becomes strong and even though the thickness of the resin is made small, it is hard to receive tensile stress due to the engagement of the gears. Therefore, the resin is prevented from breaking and the amount of resin can be reduced, whereby dimensional change of the gear due to water absorption can be reduced considerably. Since the core metal is made of aluminum alloy or copper alloy, heat is easily diffused and it can be used under comparatively high temperature. Especially, when the core metal is made of aluminum alloy and incorporated in the EPS apparatus as the worm wheel, it has the same thermal expansion coefficient as the aluminum die-cast gear housing, change of backlash of the gears due to thermal expansion is reduced extremely, making it possible to maintain preferable operation of the gears constantly.

BRIEF DESCRIPTION OF THE DRAWINGS

FIG. 14A is a side view of a worm wheel showing a sixth embodiment;

FIG. 14B is a sectional view of the worm wheel in FIG. 14A taken along lines indicated by arrows C and D;

EMBODIMENTS OF THE INVENTION

Figure 1:
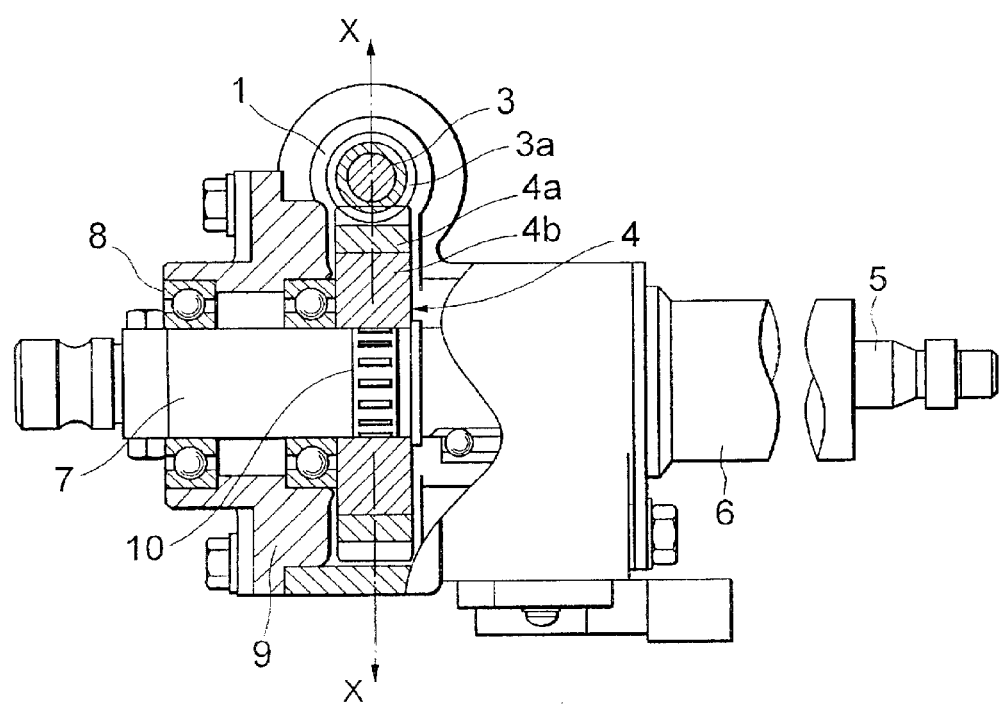
FIG. 1 is a partial sectional view showing an essential portion of an electric power steering apparatus of a first embodiment of the present invention, i.e., a power transmission mechanism in an electric driving section.
Figure 2:
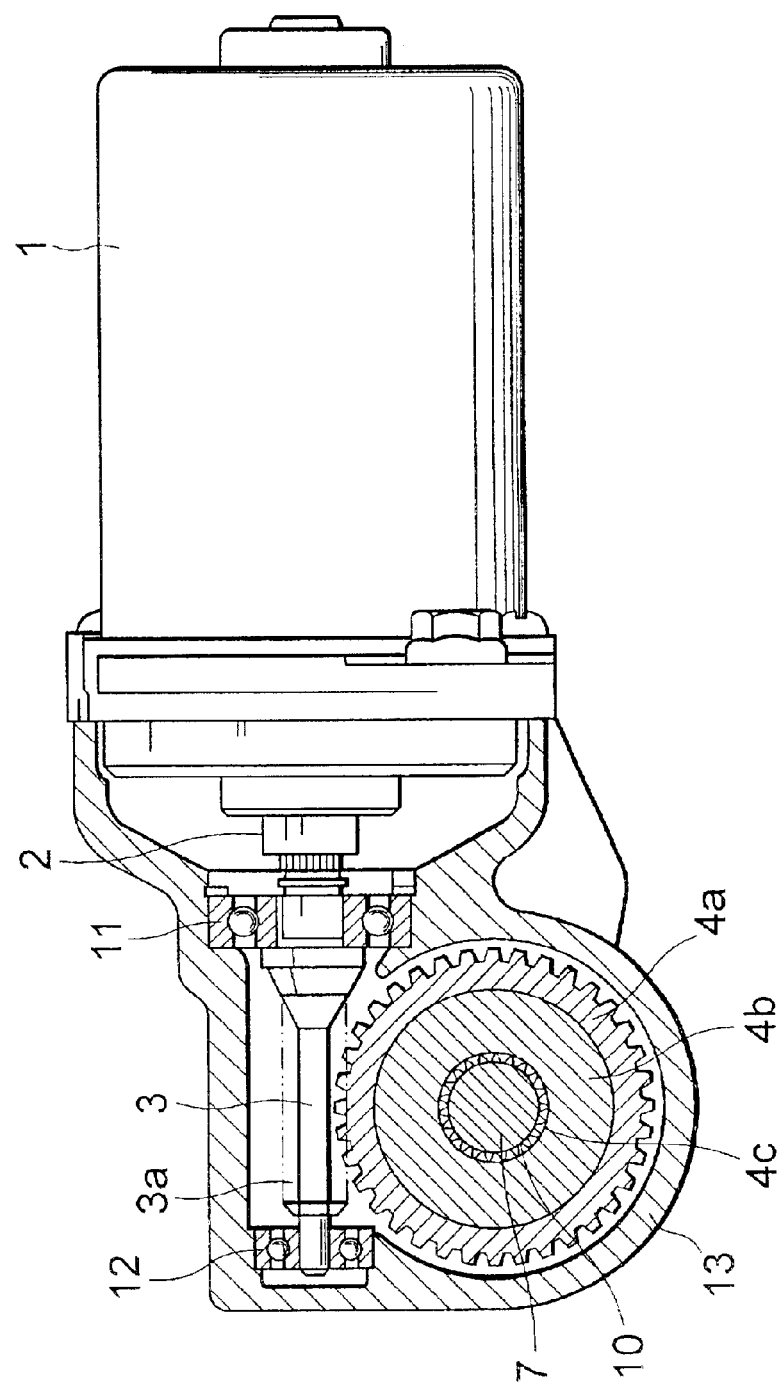
FIG. 2 is a sectional view of the power transmission mechanism in FIG. 1 taken along the X—X line.

The structure of a first embodiment of the present invention will be described by reference to drawings. FIG. 1 is a partial sectional view of the essential part of an EPS apparatus of the first embodiment, that is, the power transmission mechanism of an electric driving section in the axial direction. FIG. 2 is a sectional view of the power transmission mechanism taken along the X—X line of FIG. 1. In FIGS. 1 and 2, a reference number 1 is an electric motor for assisting in steering. 2 is an output shaft of the electric motor 1. 3 is a worm connected to the output shaft 2 by means of serration engagement or a joint, and 3a is the gear portion of the worm 3. 4 is a worm wheel having a core metal portion 4b with a hole 4c in its center and a gear portion 4a formed integrally on the outer peripheral surface of the core metal portion 4b. The gear portion 3a of the worm 3 is meshed with the gear portion 4a of the worm wheel 4. 5 is an input shaft connected to a steering wheel (not shown). 6 is a cylindrical housing for supporting the input shaft 5 rotatably around its axis. 7 is an output shaft. 8 is bearings for rotatably supporting the output shaft 7. 9 is a housing for supporting the bearings 8. 10 is a ring member mounted between the outer peripheral surface of the output shaft 7 and the hole 4c of the core metal portion 4b of the worm wheel 4 so as to apply elastic force in the radial direction. 11 and 12 are bearings for supporting the worm 3, and 13 is a housing. The input shaft 5 and the output shaft 7 are connected via a torsion bar(not shown).

Thus, the electric driving section of the present EPS apparatus is constituted of the above power transmission mechanism, and when the output shaft 2 is rotated by the electric motor 1, the worm wheel 4 is rotated via the worm 3, and the power of the electric motor 1 is transmitted to the output shaft 7.

In the above power transmission mechanism, the output shaft 7 is formed of iron material. On the other hand, the core metal portion 4b of the worm wheel 4 is formed of material such as aluminum, and the like, at least, with specific gravity smaller than that of the iron material of the output shaft 7, and a linear expansion coefficient larger than that of the iron material. Also, the gear portion 4a is formed of synthetic resin material such as nylon, and the like, having hardness and excellent formability. Thus, in the worm wheel 4 of the power transmission mechanism of the present EPS apparatus, lightening of weight, enhancement of strength and prevention of noise are achieved.

Further, the aluminum core metal portion 4b of the worm wheel 4 and the resin gear portion 4a are integrally formed by means of adhesive, or the outer peripheral surface of the core metal portion 4b is subjected to emboss, knurl or serration processing so as to have irregularities. Thus, precaution is taken so as to have the outer peripheral surface of the core metal portion 4b adequately caught to the inner peripheral surface of the resin gear portion 4a. Therefore, when the gear portion 4a is mounted integrally on the outer peripheral surface of the core metal portion 4b to form the worm wheel 4 by means of injection molding, fusion, press fit or the like, the strength of both is obtained sufficiently, thereby slip torque and slipping-off strength are secured.

Figure 3:
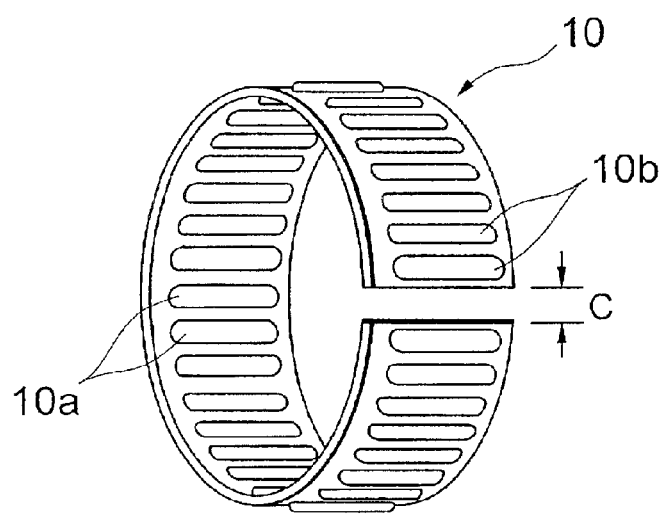
FIG. 3 is a perspective view of a ring member for applying elastic force.

The ring member 10 is formed of, for example, a known member as shown in the perspective view of FIG. 3. That is, the ring member 10 is formed by bending a thin metallic plate with a space C approximately cylindrically. The inner peripheral surface of the ring member 10 is formed with a plurality of grooves 10a in the axial direction, while the outer peripheral surface thereof is formed with a plurality of projections 10b having height in the radial direction. The ring member 10 is mounted on the output shaft 7 such that the grooves 10a are engaged with projections (not shown) provided on the outer peripheral surface of the output shaft 7. The projections 10b are formed of spring steel or the like having elasticity. When the worm wheel 4 is mounted on the projections 10b, as shown in an enlarged sectional view in FIG. 4, the projections 10b are brought into contact with the inner peripheral surface of the core metal portion 4b, applying appropriate frictional force between the ring member 10 and the output shaft 7. Thus, a torque limiter is constituted of the ring member 10 for applying elastic force in the radial direction.

Figure 4:
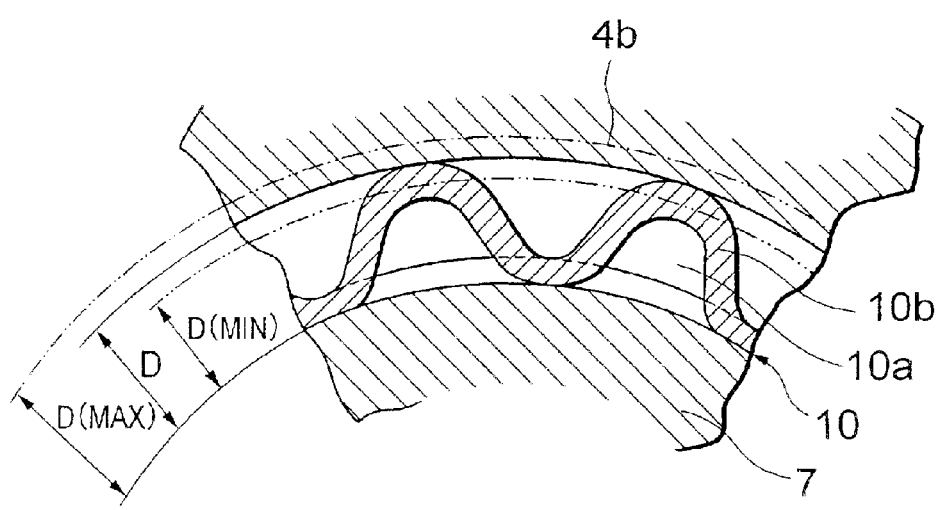
FIG. 4 is a partially enlarged sectional view showing the mounted state of the ring member for applying elastic force.

In the EPS apparatus, the limit torque of this torque limiter is determined by taking into consideration the difference between the linear expansion coefficients of the output shaft 7 and the worm wheel 4, especially its core metal portion 4b. While the output shaft 7 is formed of iron material, the core metal portion 4b is formed of aluminum material whose linear expansion coefficient is over twice that of the iron material. Therefore, due to the rise and fall of operating temperature, the distance between them, that is, the change in the linear dimension in the radial direction is varied. As shown in FIG. 4, if the distance between the outer peripheral surface of the output shaft 7 and the inner peripheral surface of the core metal portion 4b is D, the distance D becomes the maximum distance D (max) when the operating temperature is the maximum temperature, and it becomes the minimum distance D (min) when it is the minimum temperature. Accordingly, the limit torque is set such that at the maximum operating temperature, namely, in the case of the maximum distance D (max), the limit torque coincides with the predetermined interference of the ring member 10.

Figure 5:
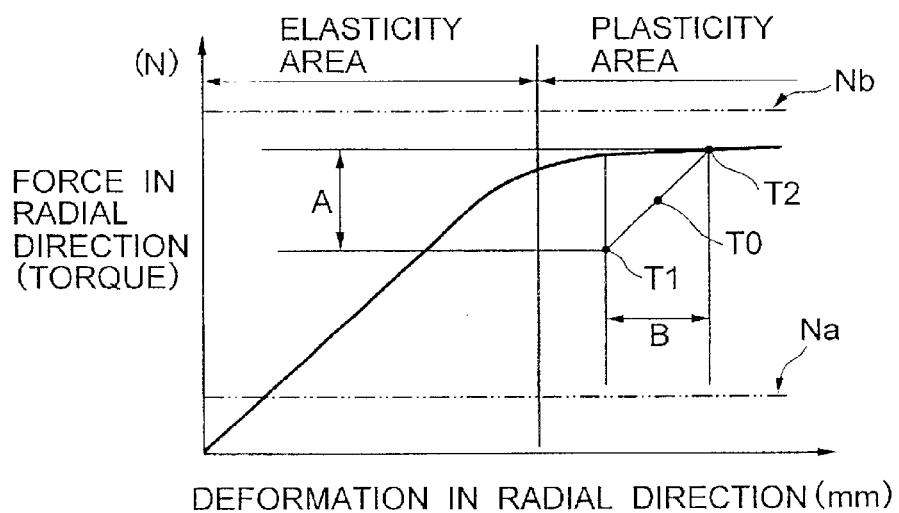
FIG. 5 is a diagram showing the relationship between the deformation of the ring member in the radial direction and the force thereof in the radial direction.

The method of setting the limit torque will be described hereafter by reference to FIG. 5 showing a relationship between the amount of deformation of the ring member 10 in the radial direction (horizontal axis) and the force (torque) in the radial direction (vertical axis). In FIGS. 5, A and B respectively represent the width of change of the limit torque of the torque limiter and the width of change of interference due to change in temperature. Also, points T0, T1 and T2 respectively represent the set value at the ordinary temperature, the set value at the maximum operating temperature and the set value at the minimum operating temperature. Further, lines Na and Nb respectively represent the rotational energizing force of the electric motor 1 and the breaking torque of the resin material. As shown in the drawing, the width A of change in the limit torque of the torque limiter is set in the range of the width B of change of the interference due to the change in temperature set within a plastic deformation area between the ordinary used specific rotational energizing force Na and the breaking torque Nb of the resin material changeable due to temperature, i.e., between the set value T1 at the maximum operating temperature and the set value T2 at the minimum operating temperature.

Figure 6:
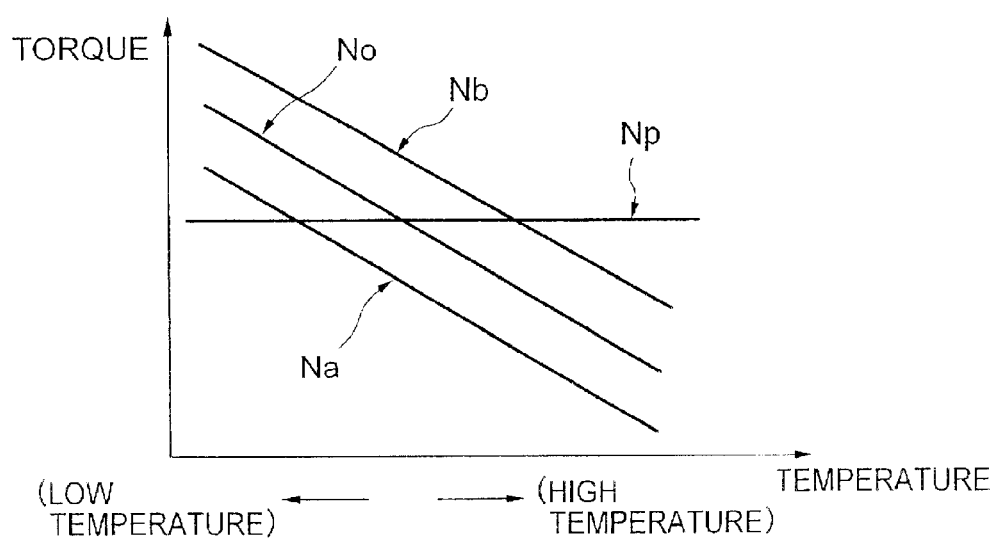
FIG. 6 is a diagram showing the relationship between torque and temperature change.

FIG. 6 is a detailed schematic drawing, showing the relationship between the temperature change (horizontal axis) and the torque (vertical axis). In the drawing, lines No and Np respectively represent the limit torque of the torque limiter of the present EPS apparatus and the limit torque of the torque limiter of a conventional EPS apparatus constituted of an iron output shaft and an iron core metal portion. As shown in the drawing, while the limit torque Np of the torque limiter of the conventional EPS apparatus is constant to temperature as described above, the limit torque No of the torque limiter of the present EPS apparatus is set between the rotational energizing force Na of the electric motor 1 changeable due to temperature and the breaking torque Nb of the resin material.

Thus, the present EPS apparatus is formed so as to obtain the slip torque according to the operating temperature.

Also, the difference of the operating temperature has an influence on the resin gear portion 4a, and the strength thereof is increased under low temperature, while it is lowered most at the maximum operating temperature.

The above first embodiment describes the power transmission mechanism constructed by a combination of the worm and the worm wheel, but the power transmission mechanism may be constructed by a combination of various gears such as a hypoid gear, a bevel gear, helical gear, etc.

In the electric power steering apparatus of the first embodiment, since the core metal portion of the worm wheel constituting the power transmission mechanism of the electric driving section is formed of the metallic material with the specific gravity smaller than that of the iron material, the weight of the worm wheel is reduced. Thereby, even though the diameter of the worm wheel is enlarged, inertia force at the time of steering is reduced and a driver's feeling of steering at the time of a cut of the steering wheel is enhanced, making it possible to correspond to high output of the EPS apparatus. When the diameter of the thus lightened core metal portion is enlarged, the diameter of the resin gear portion can be reduced, thereby canceling problems concerning formability such as dimensional change, voids, etc. due to the enlargement of the diameter of the resin portion. When aluminum whose specific gravity is about one-third of that of the iron material is chosen for the material of the core metal portion, these effects can be improved furthermore.

The structure of another embodiment of the present invention will be described by reference to drawings.

Figure 7A:
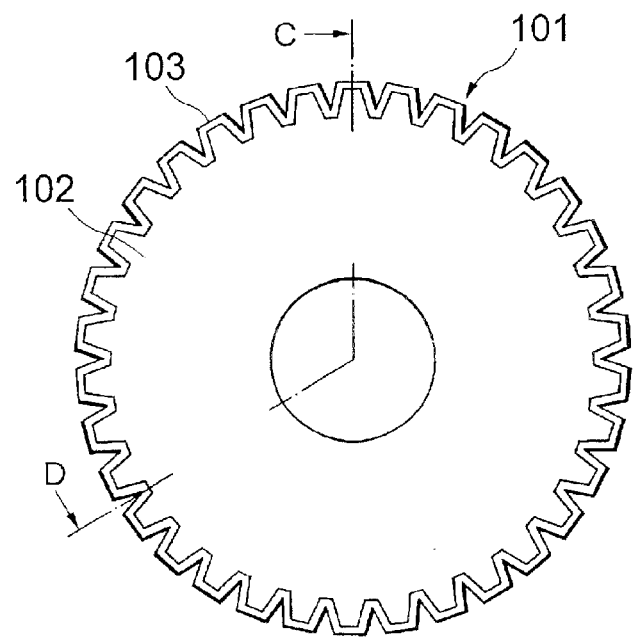
FIG. 7A is a side view of a worm wheel of a second embodiment of the present invention.
Figure 7B:
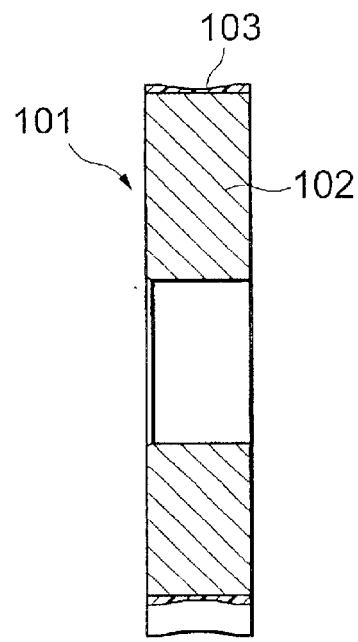
FIG. 7B is a sectional view of the worm wheel in FIG. 7A taken along lines indicated by arrows C and D.
Figure 8:
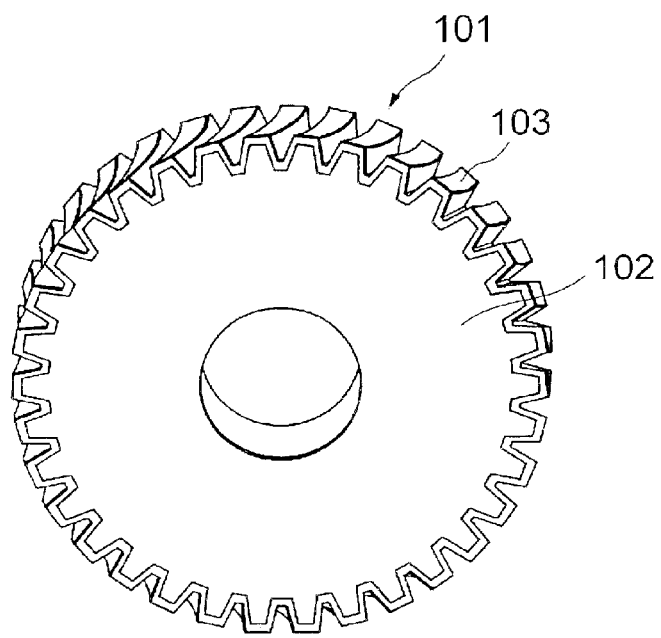
FIG. 8 is a perspective view of the worm wheel in FIG. 7A.
Figure 9:
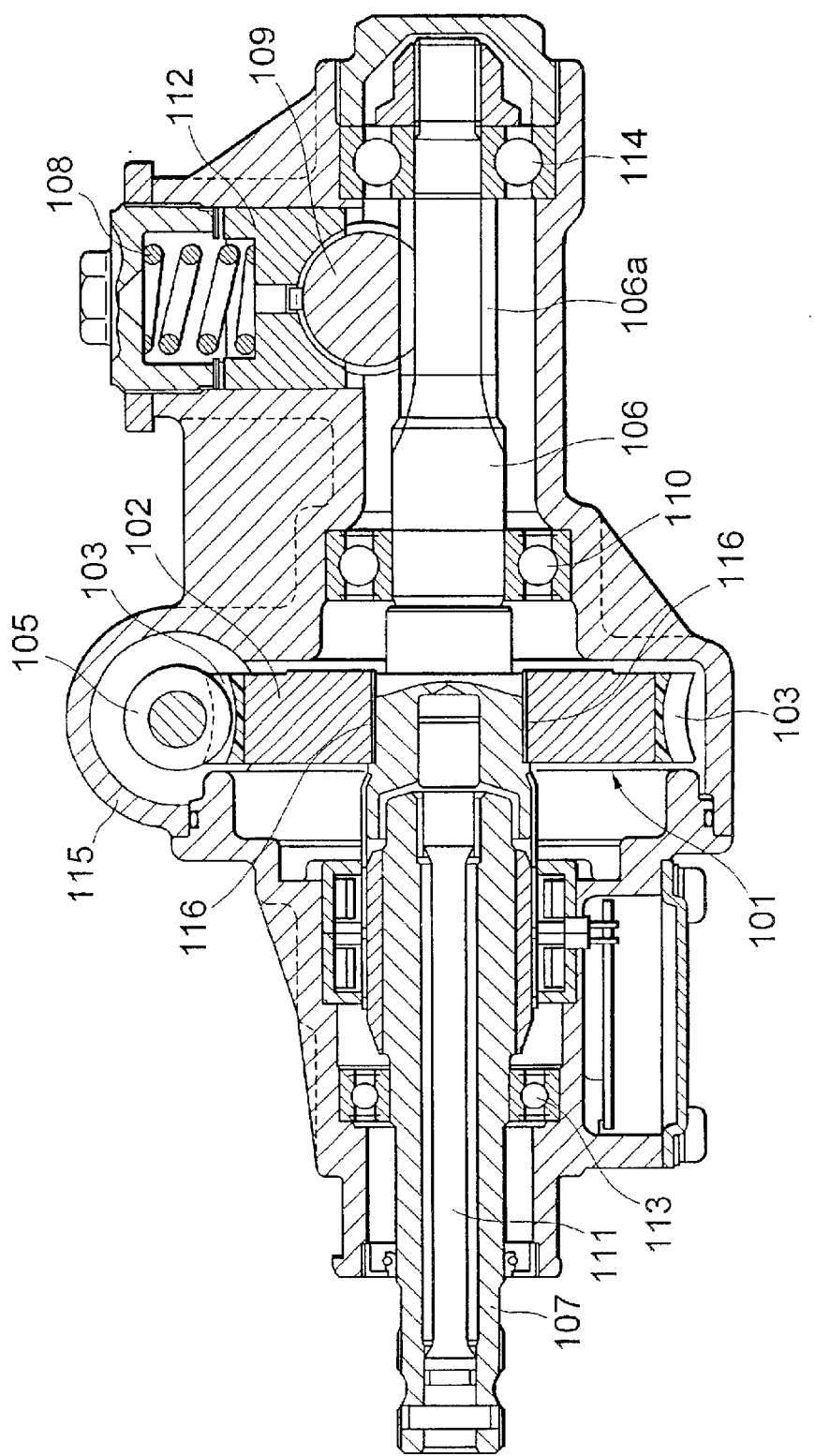
FIG. 9 is a sectional view of an EPS apparatus incorporating the worm wheel of FIG. 7A.
Figure 10:
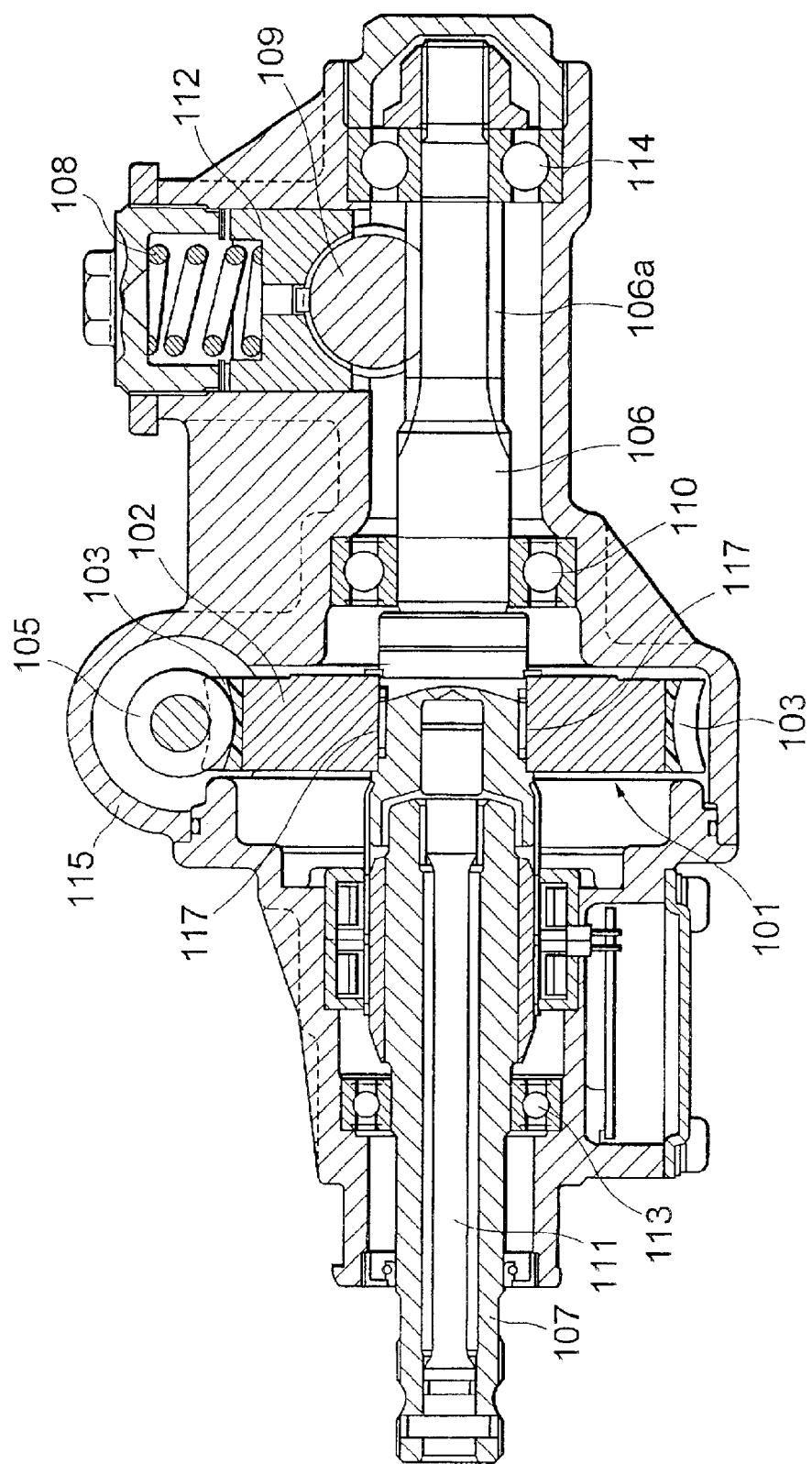
FIG. 10 is a sectional view of an EPS apparatus incorporating the worm wheel of FIG. 7A with a torque limiter showing a third embodiment.
Figure 11:
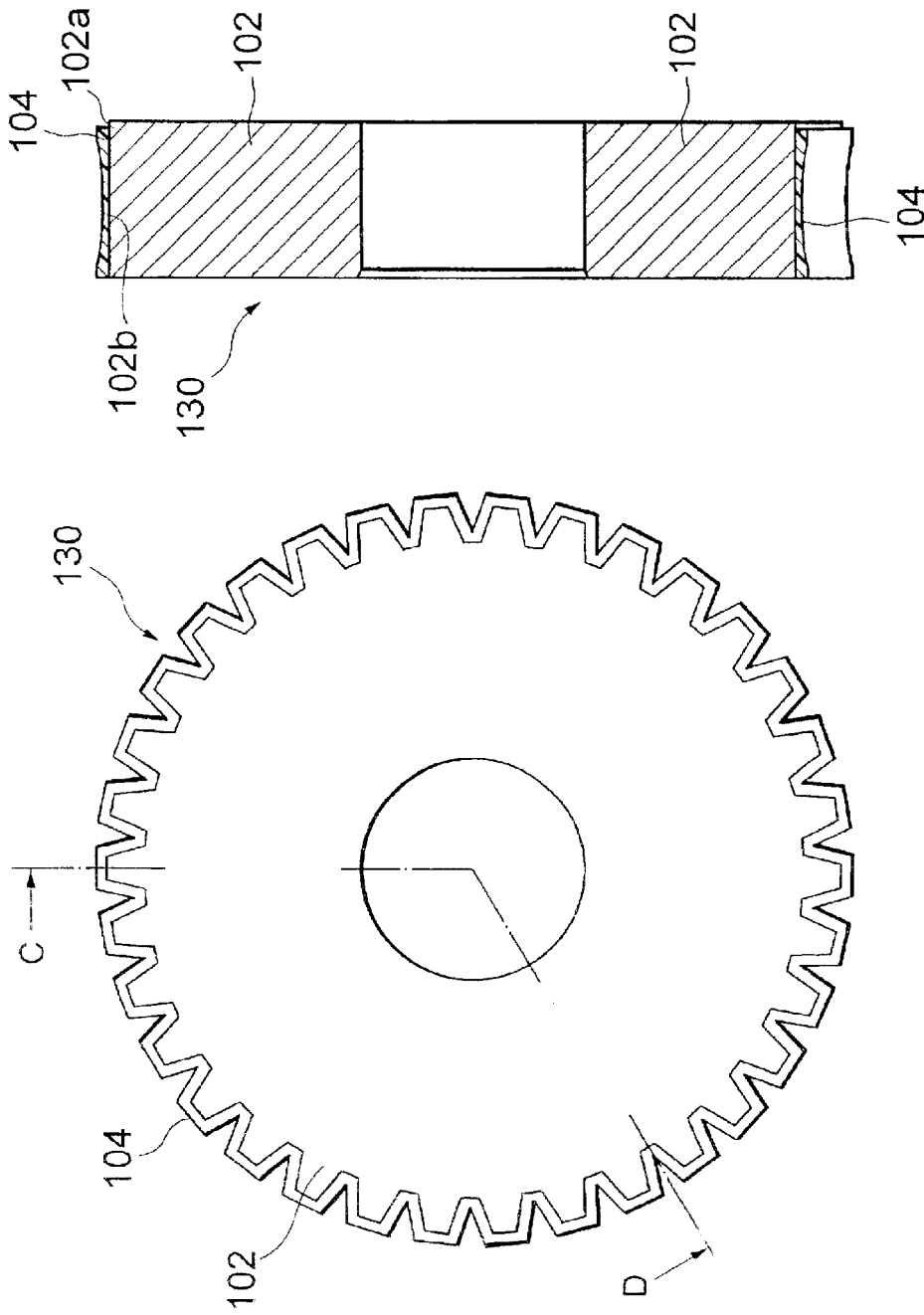
FIG. 11A is a side view of a worm wheel showing a fourth embodiment.
FIG. 11B is a sectional view of the worm wheel in FIG. 11A taken along lines indicated by arrows C and D.
Figure 12:
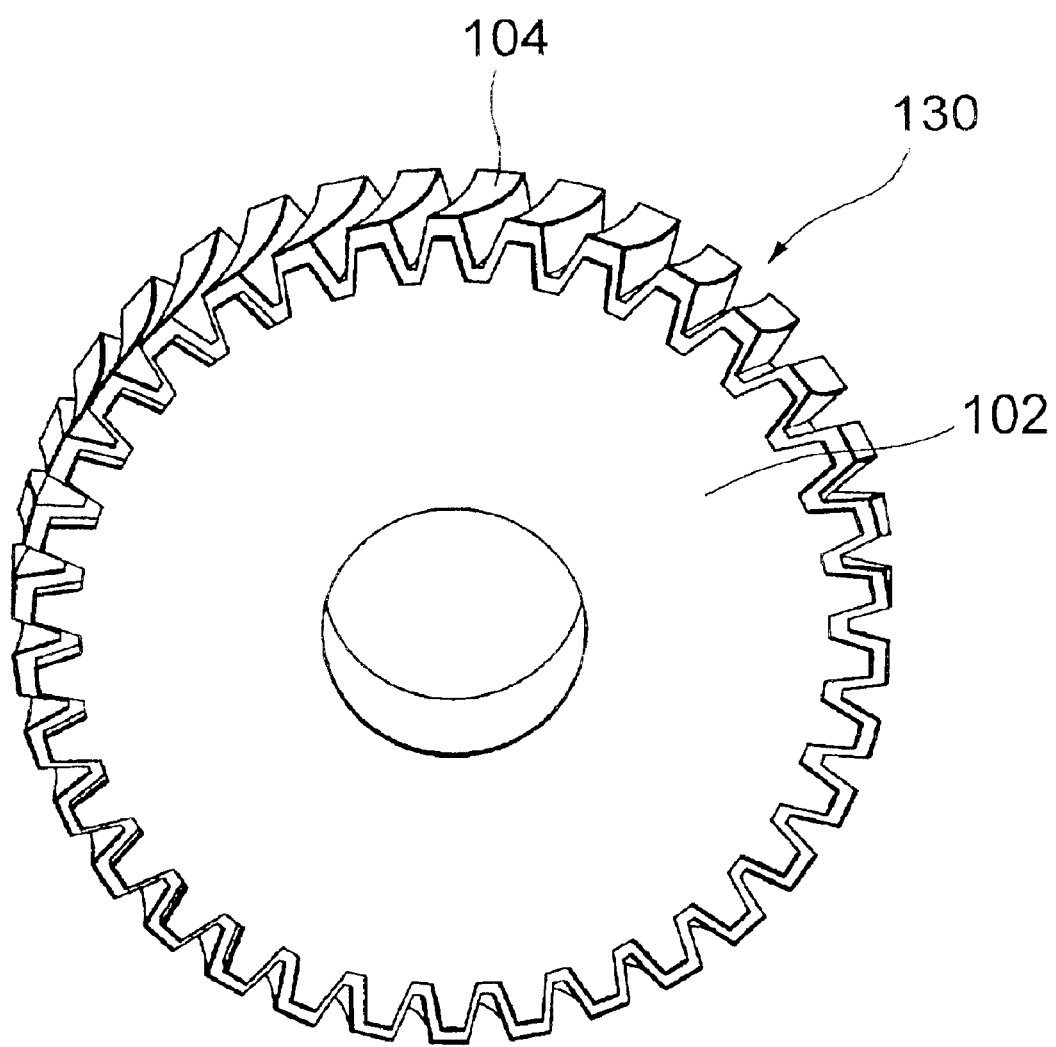
FIG. 12 is a perspective view of the worm wheel in FIG. 11A.
Figure 13B:
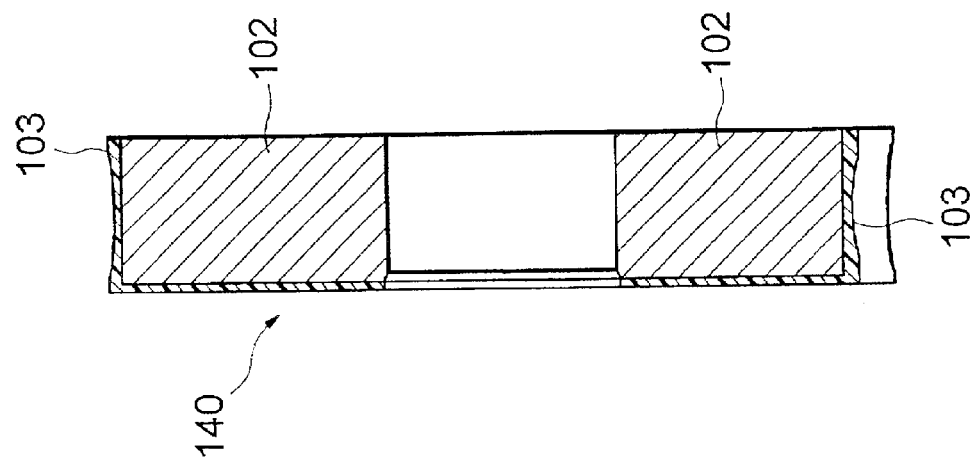
FIG. 13B is a sectional view of the worm wheel in FIG. 13A taken along the lines indicated by the arrows C and D.
Figure 13A:
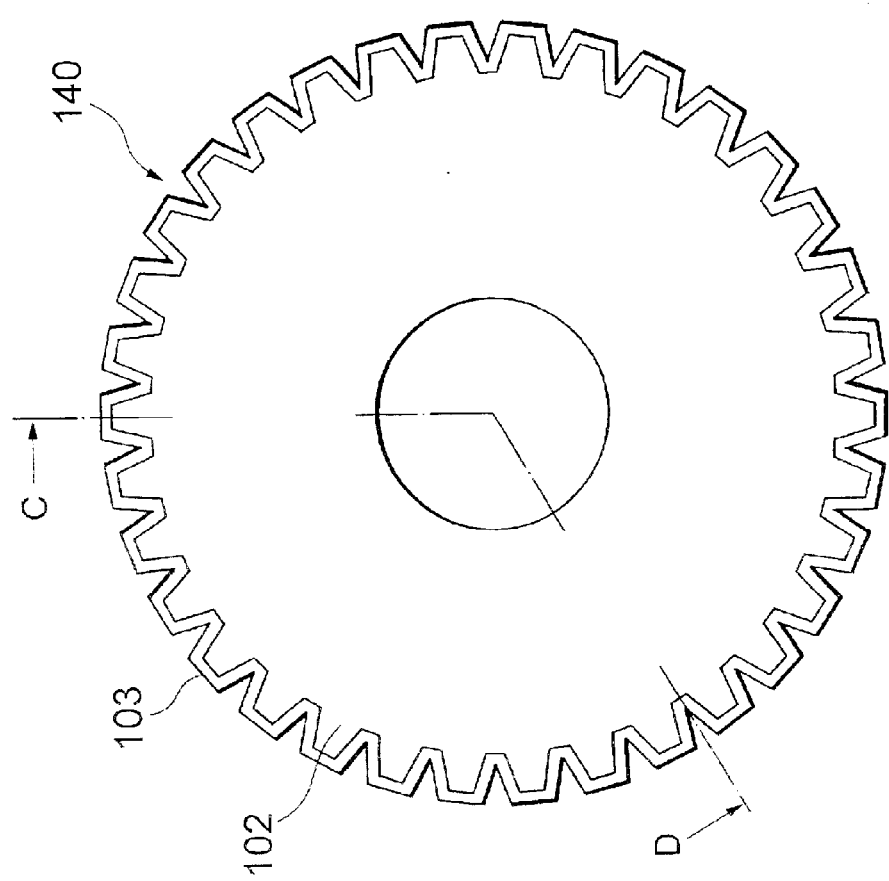
FIG. 13A is a side view of a worm wheel showing a fifth embodiment.
Figure 15B:
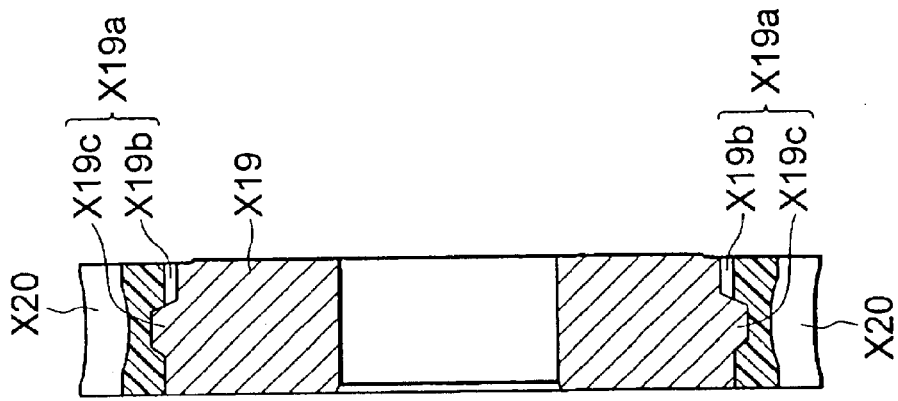
FIG. 15B is a sectional view of the worm wheel of FIG. 15A in the radial direction.
Figure 15A:
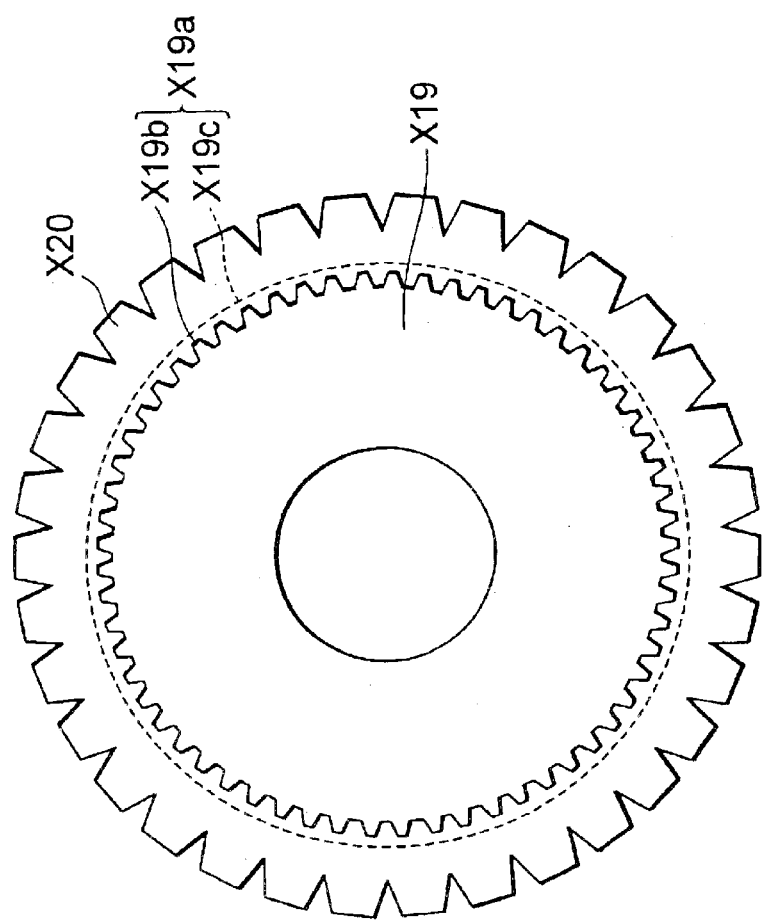
FIG. 15A is a side view of a conventional worm wheel.
Figure 16:
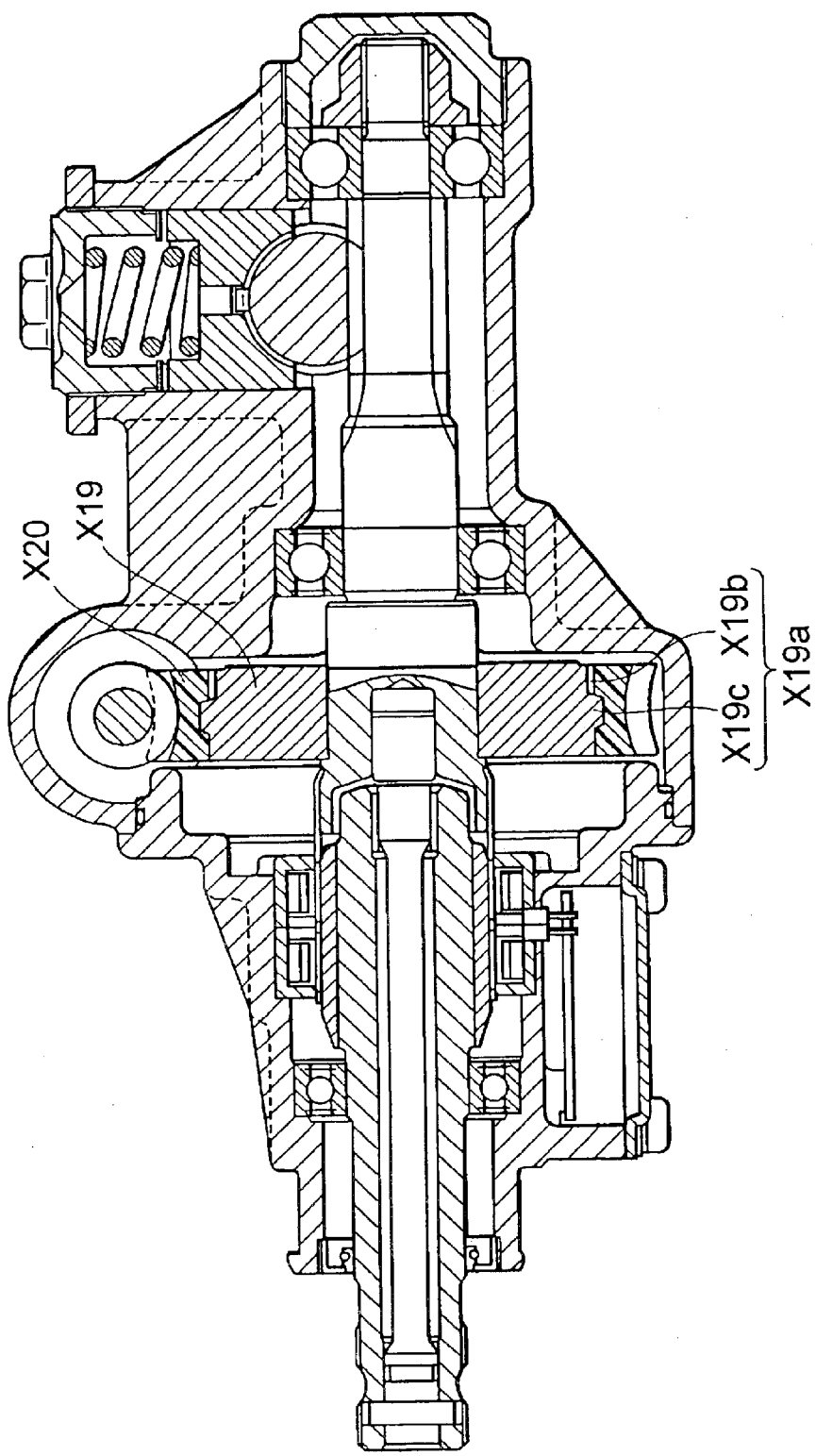
FIG. 16 is a sectional view of an EPS apparatus incorporating the worm wheel in FIG. 15A.

FIG. 7A is a side view of a worm wheel of a second embodiment of the present invention. FIG. 7B is a sectional view of the worm wheel taken along a line indicated by allows C and D in FIG. 7A. FIG. 8 is a perspective view of the worm wheel in FIG. 7A. FIG. 9 is a sectional view of an EPS apparatus incorporating the worm wheel of FIG. 7A. FIG. 10 is a sectional view of an EPS apparatus incorporating the worm wheel of FIG. 7A with a torque limiter, showing a third embodiment. FIG. 11A is a side view of a worm wheel showing a forth embodiment. FIG. 11B is a sectional view of the worm wheel in FIG. 11A taken along a line indicated by arrows C and D. FIG. 12 is a perspective view of the worm wheel in FIG. 11. FIG. 13A is a side view of a worm wheel showing a fifth embodiment. FIG. 13B is a sectional view of the worm wheel in FIG. 13A taken along a line indicated by arrows C and D. FIG. 14A is a side view of a worm wheel showing a sixth embodiment. FIG. 14B is a sectional view of the worm wheel taken along a line indicated by arrows C and D in FIG. 14A.

In FIGS. 7A, 7B and 8, a worm wheel 101 has a core metal 102 and a synthetic resin 103. The outer peripheral surface of the core metal 102 is formed in the shape of a helical gear, and the resin 103 is joined to the entire teeth surface of the core metal 102.

The joining of the resin 103 to the teeth surface of the core metal 102 is performed by way of the chemically bonding composite molding technique, e.g., the TRI composite making of Toa Denka Corporation. The completion of the joining results in formation of a helical gear whose entire tooth surface is formed of the resin 103. Thereafter, machining is carried out by the use of a hob cutter to finish the worm wheel 101.

The above TRI composite making is the technique to bind metal such as aluminum alloy, steel alloy, etc., and plastic in a metal mold by way of chemical bond, applying electro-chemical special metal surface processing and insert injection molding. The power of bonding is solid and adhesive is not used, so that minute components can be freely designed.

In the joining process of the core metal 102 and the resin 103 by way of the TRI composite making, first, the teeth surface (the entire outer peripheral surface) of the core metal 102 is subjected to organic plating processing to cause chemical reaction in an inner portion directly under the teeth surface. Next, the core metal 102 is fitted in an injection metal mold, and molten resin is injected in the metal mold to perform insert molding. Thereby, the resin 103 is joined to the teeth surface of the core metal 102.

FIG. 9 shows a pinion assist-type EPS apparatus incorporating the worm wheel 101 formed by the use of the TRI composite making. In the drawing, a steering wheel (not shown) is connected to the left end portion of an input shaft 107, and the other end portion of the input shaft 107 is connected to an output shaft (pinion shaft) 106 via a torsion bar 111. The core metal 102 of the worm wheel 101 is fitted and fixed on a connecting portion of the output shaft 106, and aluminum alloy or copper alloy is used for the core metal 102. The worm wheel 101 is meshed with a worm gear 105, and these are accommodated in a gear housing 115. A pinion 106a is formed on the other side of the output shaft 106 and engaged with a rack 109. When the output shaft 106 is rotated, the rack 109 is shifted in a rectangular direction to the paper of the drawing. In the engaging portion of the rack 109 and the pinion 106a, the rack 109 is pressed and supported by a rack guide 112 biased elastically by means of a spring 108. The rack 109 is linked to wheels via a tie rod and a link mechanism (not shown). When the steering wheel is operated and the input shaft 107 is rotated leftward or rightward, the rack 109 is shifted leftward or rightward to turn the wheels leftward or rightward. The input shaft 107 and the output shaft 106 are respectively positioned and rotatably supported by a ball bearing 113, and ball bearings 110 and 114.

The worm wheel 101 is formed such that the resin 103 is joined only to the teeth surface of the core metal 102 by way of chemical bond. Therefore, even though the layer of the resin 103 is thin, the force of the engagement of the gears bears as shearing stress of the joining surface, there is little fear of breaking. Also, in the injection molding, when high temperature resin is cooled and contracted, residual tensile stress is generated. However, breaking of a one portion causes no enlargement of the broken-out surface, so that the bonding power will not be lost.

As the aluminum alloy or the copper alloy with large thermal conductivity is used for the core metal 102, heat produced due to the engagement of the gears is easily diffused. Thereby, it is possible to use it in comparatively high temperature environment such as an engine room. Especially, when the aluminum alloy is used, the coefficient of thermal expansion thereof is the same as that of the aluminum die-cast gear housing 115 (refer to FIG. 9), change in gear backlash due to the thermal expansion is extremely reduced, making it possible to obtain the preferable operation of the gears. Also, as compared to the case where gear teeth are formed on a ring-like resin, the amount of used resin can be limited to a minimum. Therefore, it is possible to reduce the dimensional change due to water absorption, and smooth operation of the gears can be maintained. Since the core metal 102 takes up the most part of the whole volume of the worm wheel 101, the strength of the gear can be obtained by means of the core metal 102, whereby a gear module can be reduced in size. Therefore, it is possible to realize miniaturization of the apparatus and low cost.

In the second embodiment, the joining of the core metal 102 and the resin 103 is performed by way of the chemical bond according to the TRI composite technology, but is not limited thereto, and even if those are joined by the use of appropriate adhesive with high adhesive strength and high heat resistance, the same effect can be expected. However, in this case, the bonding power is inferior to that of the chemical bond.

Also, as the aluminum alloy or copper alloy is utilized for the material of the core metal 102, the coefficient of thermal expansion thereof is different from that of the iron output shaft 106, so that it is not possible to obtain sufficient holding power by way of the conventional press fit. Therefore, as shown in FIG. 9, the output shaft 106 is inserted in an inner-fitting portion (hole) 116 of the core metal 102 by way of serration press fit.

FIG. 10 shows structure of a third embodiment. In this embodiment, a torque limiter is provided between the worm wheel 101 and the output shaft 106 of an EPS apparatus, and other than this portion is the same as that of the EPS apparatus in the second embodiment. As the torque limiter mounted between the hole of the core metal 102 of the worm wheel 101 and the outer peripheral surface of the output shaft 106, a known tolerance ring 117 for applying elastic force in the radial direction is used, whereby, at the time of occurrence of excessive torque, slip is developed between the worm wheel 101 and the output shaft 106, and transmission of the excessive torque can be prevented. With respect to the output shaft 106 formed of the iron material, as mentioned above, when the core metal 102 is formed of material with small specific gravity and a large coefficient of thermal expansion, e.g., preferably aluminum alloy (or copper alloy), the limit torque of the torque limiter is set low under high temperature and it is set high under low temperature, whereby the predetermined slip torque can be obtained in accordance with change in operating temperature. As above, it is possible to take the structure combining the worm wheel of the present invention and the torque limiter. Accordingly, in addition to the effects described in the second embodiment, the EPS apparatus of this embodiment can prevent excessive torque from transmitting.

Next, a fourth embodiment will be described by reference to FIGS. 11A, 11B and FIG. 12. A worm wheel 130 of the fourth embodiment is approximately the same as that of the second embodiment, and identical members are designated with identical numbers. The different point is that a resin 104 is attached not to the entire teeth surface of the core metal 102 but to a portion thereof.

At the time of the resin injection of the worm wheel 130, a portion 102a of the teeth surface is fitted in an injection metal mold so as to adjust phases, and the resin is joined to a remaining portion 102b of the teeth surface. Thereafter, the worm wheel 130 is subjected to a worm teeth cutting processing by means of the hob cutter. The other formation processing is the same as that of the second embodiment, and then the description thereof will be omitted. In this case, the volume of the resin 104 is smaller than that of the resin 103, so that the dimensional change due to water absorption can be reduced.

FIGS. 13A and 13B show a fifth embodiment. A worm wheel 140 of this embodiment is approximately the same as that of the second embodiment, and same numbers are given to same members. A different point is that a one side of the core metal 102 in the axial direction is covered with the resin 103 having a constant thickness by way of the TRI composite making technology. Accordingly, when burrs produced in the teeth cutting processing by means of the hob cutter are removed by a lathe, its deburring can be performed easily.

A sixth embodiment is shown in FIGS. 14A and 14B. A worm wheel 150 of this embodiment is approximately the same as that of the second embodiment, and identical members are designated with identical numbers. The different point is that a portion other than a bearing portion 118a of the core metal 118 is formed thinly. Thereby, its heat dissipation ability is further improved, and lightening is achieved.

The above second, fourth, fifth and six embodiments describe the structures and forming processes of the resin gears as the worm wheels incorporated in the EPS apparatuses, but these structures and forming processes are not limited to worm wheels, and are applicable widely to resin gears.

As described above, in the resin gear wherein the thin resin is joined to the entire outer peripheral surface of the teeth portion of the gear-shaped core metal, since this joining is carried out by way of the chemical bond in accordance with the chemically bonding composite molding technique or the adhesive, the resin gear receives force applied due to engagement of the gears as shearing stress of the joining portion. Therefore, even though the layer of the resin is made thin, its breaking can be prevented to the utmost. Also, in the case of the injection molding, when the high temperature resin is cooled and contracted, residual tensile stress is generated, but a one broken portion does not cause enlargement of the broken-out surface, and the bonding power is sustained to enhance its safety.

Further, as aluminum alloy or copper alloy is utilized for the core metal, heat produced due to the engagement of the gears is easily diffused, enabling its usage under comparatively high temperature environment.

Particularly, when the core metal of the worm wheel is formed of aluminum alloy and the worm wheel is incorporated in the EPS apparatus, the coefficient of thermal expansion of the aluminum alloy is the same as that of the aluminum die-cast gear housing, change in backlash of the gears due to thermal expansion is reduced extremely, so that preferable operation of the gears can be maintained invariably.

In comparison to a case wherein a gear is formed in a ring-like resin, the amount of used resin can be kept to a minimum. Therefore, the dimensional change due to water absorption can be reduced extremely, making it possible to secure smooth operation of the gears and to reduce cost.

Furthermore, as it is structured that the core metal takes up the most part of the whole volume of the worm wheel, the strength of the gear can be obtained by means of the core metal, so that the gear module can be reduced in size, contributing to achievement of miniaturization of the apparatus.

What is claimed is:

1. An electrical power assisted steering apparatus provided with a torque limiter having a ring member formed with a plurality of radially outwardly curved projections for applying elastic force mounted between a worm wheel and an output shaft, wherein said output shaft is made of iron material, a gear portion of said worm wheel is made of synthetic resin material, and a core metal portion of said worm wheel is made of aluminum material which has a specific gravity smaller than that of said iron material of the output shaft and which has a coefficient of linear thermal expansion larger than that of said iron material of the output shaft, and wherein the gear portion and the core metal portion are fixedly joined, whereby a change in spacing between said worm wheel and said output shaft as a result of differential thermal expansion therebetween operates to change a limit torque of said torque limiter from a lower value under high temperature to a higher value under low temperature.

2. An electrical power assisted steering apparatus according to claim 1, wherein said gear portion and said core portion are joined by way of chemical bond according to a composite molding technique.

3. An electrical power assisted steering apparatus according to claim 1, wherein the outer peripheral surface of the core metal portion is formed with irregularities for strengthening the joining between said core metal portion and said resin gear portion.

4. An electrical power assisted steering apparatus according to claim 3, wherein the outer peripheral surface of the core metal is toothed to provide said irregularities.

5. An electrical power assisted steering apparatus comprising:
a worm wheel formed with an axial through hole at a center thereof,
an output shaft fitted in the axial through hole of said worm wheel, and
a torque limiter comprising a ring member formed with a plurality of radially outwardly curved projections for applying elastic force;
wherein said output shaft is made of iron material, a gear portion of said worm wheel is made of synthetic resin material, and a core metal portion of said worm wheel is made of aluminum material which has a specific gravity smaller than that of said iron material of the output shaft, and which has a coefficient of linear thermal expansion larger than that of said iron material of the output shaft,
said gear portion and said core metal portion being fixedly joined,
wherein said ring member of said torque limiter comprises a substantially cylindrical thin metal member made of spring steel and formed with a plurality of radially outwardly curved projections, the substantially cylindrical thin metal member being press-fitted on the output shaft with said projections being in pressure contact with an inner peripheral surface defining said axial through hole of said worm wheel, and
whereby a limit torque of said torque limiter will vary based upon an operating temperature of said steering apparatus.

6. An electrical power assisted steering apparatus according to claim 5, wherein said gear portion and said core portion are joined by way of chemical bond according to a composite molding technique.

7. An electrical power assisted steering apparatus according to claim 5, wherein the outer peripheral surface of the core metal portion is formed with irregularities for strengthening the joining between said core metal portion and said resin gear portion.

8. An electrical power assisted steering apparatus according to claim 7, wherein the outer peripheral surface of the core metal is toothed to provide said irregularities.

9. An electrical power assisted steering apparatus comprising:
a housing made of aluminum;
an input shaft rotatably supported in said housing and connected at one end to a steering wheel;
an output shaft rotatably supported in said housing and connected at one end to said input shaft and at the other end to a steering gear box, the output shaft being made of iron material;
an electric motor for steering assistance;
a gear mechanism for transmitting rotation of said motor to said output shaft, the gear mechanism being received in said aluminum housing and including a worm gear rotated by said motor, and a worm wheel with an axial throughhole formed in a center thereof, in which said output shaft is fitted, the worm wheel being engaged with said worm gear;
said worm wheel comprising a core metal portion made of aluminum material which has a specific gravity smaller than that of said iron material of the output shaft and a coefficient of linear thermal expansion larger than that of said iron material of the output shaft, and an outer peripheral annular gear portion made of synthetic resin material and fixedly joined onto an outer peripheral surface of said core metal portion; and
a torque limiter comprising a substantially cylindrical thin metal member made of spring steel and formed with a plurality of radially outwardly curved projections, the substantially cylindrical thin metal member being press-fitted on the output shaft with said projections being in pressure contact with an inner peripheral surface defining said axial throughhole of said worm wheel.

10. An electrical power assisted steering apparatus according to claim 9, wherein said gear portion and said core portion are joined by way of chemical bond according to a composite molding technique.

11. An electrical power assisted steering apparatus according to claim 9, wherein the outer peripheral surface of the core metal portion is formed with irregularities for strengthening the joining between said core metal portion and said resin gear portion.

12. An electrical power assisted steering apparatus according to claim 11, wherein the outer peripheral surface of the core metal is toothed to provide said irregularities.

* * * * *